United States Patent
Jung (10) Patent No.: US 9,930,001 B2
(45) Date of Patent: Mar. 27, 2018

(54) CONDITIONAL DISCLOSURE OF A RESPONSE TO CONTENT POSTED IN A SOCIAL NETWORK

(71) Applicant: Empire Technology Development LLC, Wilmington, DE (US)

(72) Inventor: Yang-Won Jung, Seoul (KR)

(73) Assignee: EMPIRE TECHNOLOGY DEVELOPMENT LLC, Wilmington, DE (US)

(*) Notice: Subject to any disclaimer, the term of this patent is extended or adjusted under 35 U.S.C. 154(b) by 0 days.

(21) Appl. No.: 14/926,417

(22) Filed: Oct. 29, 2015

(65) Prior Publication Data

US 2016/0156585 A1   Jun. 2, 2016

Related U.S. Application Data

(63) Continuation of application No. 13/878,153, filed as application No. PCT/US2012/066328 on Nov. 21, 2012, now Pat. No. 9,208,473.

(51) Int. Cl.
| | |
|---|---|
| *H04L 12/58* | (2006.01) |
| *G06Q 50/00* | (2012.01) |
| *G06Q 10/10* | (2012.01) |
| *G06F 17/30* | (2006.01) |

(52) U.S. Cl.
CPC ........ *H04L 51/32* (2013.01); *G06F 17/30345* (2013.01); *G06Q 10/101* (2013.01); *G06Q 50/01* (2013.01); *H04L 51/12* (2013.01)

(58) Field of Classification Search
None
See application file for complete search history.

(56) References Cited

U.S. PATENT DOCUMENTS

| 6,377,944 | B1 | 4/2002 | Busey et al. |
| 7,523,138 | B2 | 4/2009 | Gruhl et al. |
| 8,051,074 | B2 * | 11/2011 | Eom ..................... G06F 17/211 |
| | | | 707/722 |
| 8,326,684 | B1 | 12/2012 | Halahmi et al. |
| 9,367,864 | B2 * | 6/2016 | Lee ................... H04L 29/06476 |

(Continued)

OTHER PUBLICATIONS

"American Express Launches "Link, Like, Love" on Facebook—First-Ever Platform to Deliver Deals, Access and Experiences Based on Cardmember "Likes" and Interests," accessed at https://web.archive.org/web/20121021190441/http://about.americanexpress.com/news/pr/2011/link.aspx, posted on Jul. 19, 2011, pp. 1-2.

"Beyond the Arc | Customer Experience Strategy, Data Analytics, Voice of the Customer Solutions, Social Media Analytics, Predictive Analytics," accessed at https://web.archive.org/web/20120824233810/http://www.beyondthearc.com/, accessed on Mar. 3, 2015, p. 1-1.

(Continued)

*Primary Examiner* — Shirley Zhang
(74) *Attorney, Agent, or Firm* — Brundidge & Stanger, P.C.

(57) ABSTRACT

Technologies are generally described for a social networking service (SNS). In some examples, a method performed under control of a server may include receiving a user input associated with the user responding to content posted in an online forum, determining whether a threshold condition set by the user is satisfied for the user's response to be disclosed with regard to a particular piece of content posted in the online forum, and disclosing the user's response to the particular piece of content posted in the online forum when the threshold condition is determined to be satisfied.

20 Claims, 5 Drawing Sheets

(56) References Cited

U.S. PATENT DOCUMENTS

| | | |
|---|---|---|
| 2003/0225862 A1 | 12/2003 | Watanabe et al. |
| 2007/0288546 A1 | 12/2007 | Rosenberg |
| 2011/0218846 A1 | 9/2011 | Fieldman et al. |
| 2011/0258560 A1 | 10/2011 | Mercuri et al. |
| 2012/0023094 A1 | 1/2012 | Messina et al. |
| 2012/0226678 A1 | 9/2012 | Park et al. |
| 2013/0060859 A1 | 3/2013 | Olsen et al. |
| 2013/0138735 A1* | 5/2013 | Kanter .................. G06Q 50/01 709/204 |
| 2013/0159885 A1 | 6/2013 | Yerli |

OTHER PUBLICATIONS

"SociableBiog: Social Media News & Tips—Facebook, Twitter, Google, Startup," accessed at https://web.archive.org/web/20120920005545/http://www.sociableblog.com/, accessed on Mar. 3, 2015, pp. 1-8.

"WhosRich.me—Track Friends' Shopping Habits," accessed at https://web.archive.org/web/20091222021411/http://www.sociableblog.com/2009/10/13/whosrichme/, accessed on Mar. 3, 2015, pp. 1-6.

International Search Report from International Application No. PCT/US12/66328 dated Jan. 13, 2013.

What's in a "Like"—6 Secrets to the Power of the Facebook Like Button, by dotJenna, 2011. www.dotjenna.com/what-in-a-like/, 11pages.

* cited by examiner

CONDITIONAL DISCLOSURE OF A RESPONSE TO CONTENT POSTED IN A SOCIAL NETWORK

CROSS-REFERENCE TO RELATED APPLICATIONS

This application is a continuation application under 35 U.S.C. § 120 of U.S. patent application Ser. No. 13/878,153, filed on Apr. 5, 2013, now U.S. Pat. No. 9,208,473, which is a U.S. National Stage filing under 35 U.S.C. § 371 of International Application No. PCT/US12/66328, filed on Nov. 21, 2012. The disclosures of both U.S. patent application Ser. No. 13/878,153 and International Application No. PCT/US12/66328 are hereby incorporated by reference in their entireties.

BACKGROUND

Social networking services such as, for example, Facebook® and Twitter® are widely used worldwide. Via such social networking services, users freely post descriptions of their activities, their ideas and/or opinions, images and/or videos, news, and/or any other digital content that they want to share with others. Also, the users can express their opinion with regard to other users' posts by simply using the "like" function of Facebook® and/or the "retweet" function of Twitter®.

SUMMARY

In an example, a method performed under control of a server may include receiving a user input associated with the user responding to content posted in an online forum, determining whether a threshold condition set by the user is satisfied for the user's response to be disclosed with regard to a particular piece of content posted in the online forum, and disclosing the user's response to the particular piece of content posted in the online forum when the threshold condition is determined to be satisfied.

In another example, a social networking service (SNS) server may include a user input receiving unit configured to receive a user input associated with the user making a response to content posted in an online forum, and a disclosure determination unit configured to determine whether to disclose the user's response to a particular piece of content posted in the online forum based at least in part on a threshold condition being satisfied.

In yet another example, a computer-readable storage medium may store thereon computer-executable instructions that, in response to execution, cause a server to perform operations including receiving a user input associated with the user making a response to a particular piece of content posted in an online forum, and conditionally disclosing the user's response to the particular piece of content posted in the online forum when a threshold condition is satisfied.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the drawings, can be arranged, substituted, combined, separated, and designed in a wide variety of different configurations, all of which are explicitly contemplated herein.

This disclosure is generally drawn, inter alia, to methods, apparatuses, systems, devices, and computer program products related to a social networking service (SNS). Further, technologies are herein generally described for conditionally disclosing user's response to a piece of content posted in an online forum, such as, for example, in a social networking sites (e.g., Facebook®, Twitter®, etc.), blogs, news article sites, and so on.

In some examples, a user may wish to respond to a particular piece of content posted in the online forum. By way of example, but not limitation, the user may express his/her consent, interest and/or agreement with the piece of content posted in the online forum by giving a favorability rating to the piece of content (e.g., "like" in Facebook®) and/or re-posting the piece of content (e.g., "retweet" in Twitter®). However, at the same time, the user may be concerned with others' opinions about the piece of content. As a descriptive example only, when the piece of content is critical of the user's boss, the user may want to express agreement with the posted content, but the user may be concerned with the boss' reaction to the posted content. In such cases, the user may use a conditional disclosure function provided by a server (e.g., a social networking service (SNS) server). In the above example, the user may request that the server disclose his/her response only if the user's boss makes a same response to the posted content.

In some examples, the user may set a condition under which the server may determine to disclose the user's response to the piece of content. By way of example, but not limitation, the user may set the condition for disclosing his/her response as a threshold number of other users having made a same response. As another example, but not as a limitation, the user may set the condition for disclosing his/her response as a threshold number of other users in a predetermined group (e.g., a social group such as a family group, a friends group, a co-workers group, etc.) having made a same response. As yet another example, but not as a limitation, the user may set the condition for disclosing his/her response as a specified other user (e.g., a boss, parents, etc.) having made a same response.

In some example embodiments, the server may provide the user with a condition setting tool so that the user may select his/her desired condition. As an example, but not as a limitation, the server may allow the user to determine and/or select the condition whenever the user responds to a piece of content in the online forum. As another example, but not as a limitation, the server may allow the user to specify a default condition to be applied when the user responds to any piece of content in the online forum.

Figure 1:
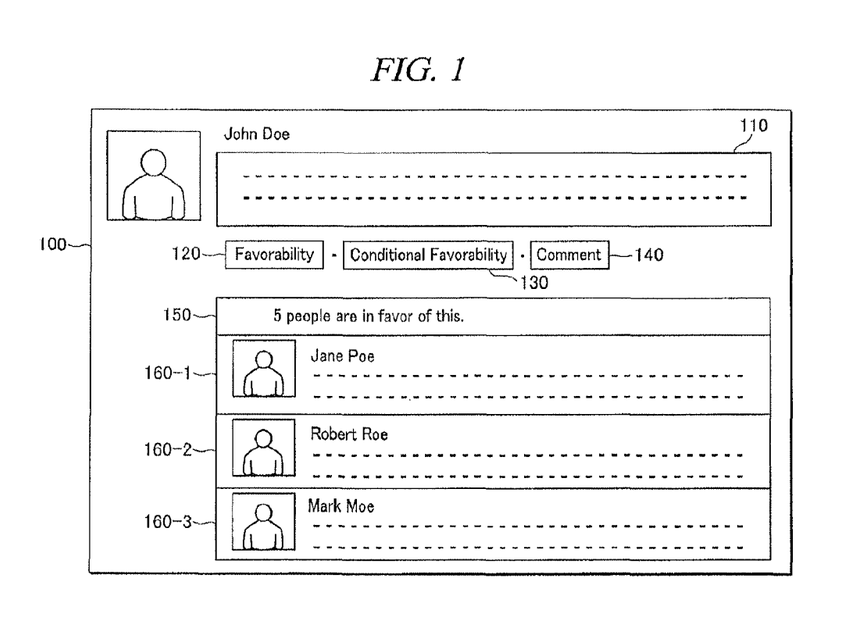
FIG. 1 schematically shows an illustrative example of an online forum, arranged in accordance with at least some embodiments described herein.

FIG. 1 schematically shows an illustrative example of an online forum 100, arranged in accordance with at least some embodiments described herein.

As depicted, one of users of online forum 100 (whose name is "John Doe" in FIG. 1) may post content 110 in online forum 100. Online forum 100 may show content 110 as well as multiple buttons including, for example, a favorability button 120, a conditional favorability button 130, and a comment button 140, for interfacing with the users of online forum 100. By way of example, but not limitation, the users of online forum 100 may make their favorable response, i.e., express their favorability (e.g., consent, interest and/or appreciation) to content 110 by tapping or clicking favorability button 120 or conditional favorability button 130. The users may also write or post comments on content 110 by tapping or clicking comment button 140. Online forum 100 may also show a text 150 indicating a number of people who expressed favorability of content 110. When the users tap or click on text 150, online forum 100 may show a list of users who expressed favorability of content 110. Online forum 100 may also show comments 160-1, 160-2 and 160-3 written by the users.

In some embodiments, online forum 100 may provide the users with a conditional favorability function. The users may use the conditional favorability function by tapping or clicking conditional favorability button 130. When one of the users (hereinafter, user A) taps or clicks conditional favorability button 130, a server (not shown) associated with online forum 100 (e.g., hosting, operating and/or controlling online forum 100) may determine whether a threshold condition, which may set by user A, is satisfied for content 110. Then, the server may disclose user A's response to content 110 (i.e., giving a favorability rating to content 110), when it has been determined that the threshold condition is satisfied. In some embodiments, the server may enable user A to set or determine the threshold condition by providing user A with a condition setting tool, which will be described in more details with reference to FIG. 2.

In some embodiments, the threshold condition may be associated with one or more responses made by other users with regard to content 110. By way of example, but not limitation, the threshold condition may be associated with a minimum number of the other users who have made a same response with regard to content 110, that is, who expressed favorability of content 110. In such cases, when the number of the other users who expressed favorability of content 110 is less than the threshold number set by user A, online forum 100 may not disclose that user A has expressed his/her favorability of content 110. Meanwhile, when the number of the other users who expressed favorability of content 110 is at least equal to the threshold number, online forum 100 may disclose that user A also expressed favorability of content 110.

In some other embodiments, the threshold condition may be associated with one or more responses made by other users in a predetermined group (e.g., a social group such as a family group, a friends group, a co-workers group, etc.) with regard to content 110. By way of example, but not limitation, the threshold condition may be associated with a threshold number of the other users in the predetermined group who have made a same response with regard to content 110, that is, who expressed favorability of content 110. In such cases, when the number of the other users in the predetermined group who expressed favorability of content 110 is less than the threshold number set by user A, online forum 100 may not disclose that user A has expressed his/her favorability of content 110. Meanwhile, when the number of the other users in the predetermined group who expressed favorability of content 110 is at least equal to the threshold number, online forum 100 may disclose that user A also expressed favorability of content 110.

In yet some other embodiments, the threshold condition may be associated with a specified other user's response to content 110. By way of example, but not limitation, user A may specify or select another user (hereinafter, user B), so that when user B has made a same response with regard to content 110, that is, has expressed his/her favorability of content 110, online forum 100 may disclose that user A also expressed favorability of content 110.

In some embodiments, when the server determines not to disclose user A's response, online forum 100 may not count user A in the number of people to be shown as text 150. In some alternative embodiments, when the server determines not to disclose user A's response, online forum 100 may count user A in the number of people to be shown as text 150, but conceal an identity of user A in the list of users who expressed favorability of content 110.

Although it is described that online forum 100 shows favorability button 120 and conditional favorability button 130 separately in the above examples, those skilled in the art will appreciate that online forum 100 may provide the users with one kind of favorability button which may serve as both of favorability button 120 and conditional favorability button 130 in FIG. 1.

Figure 2:
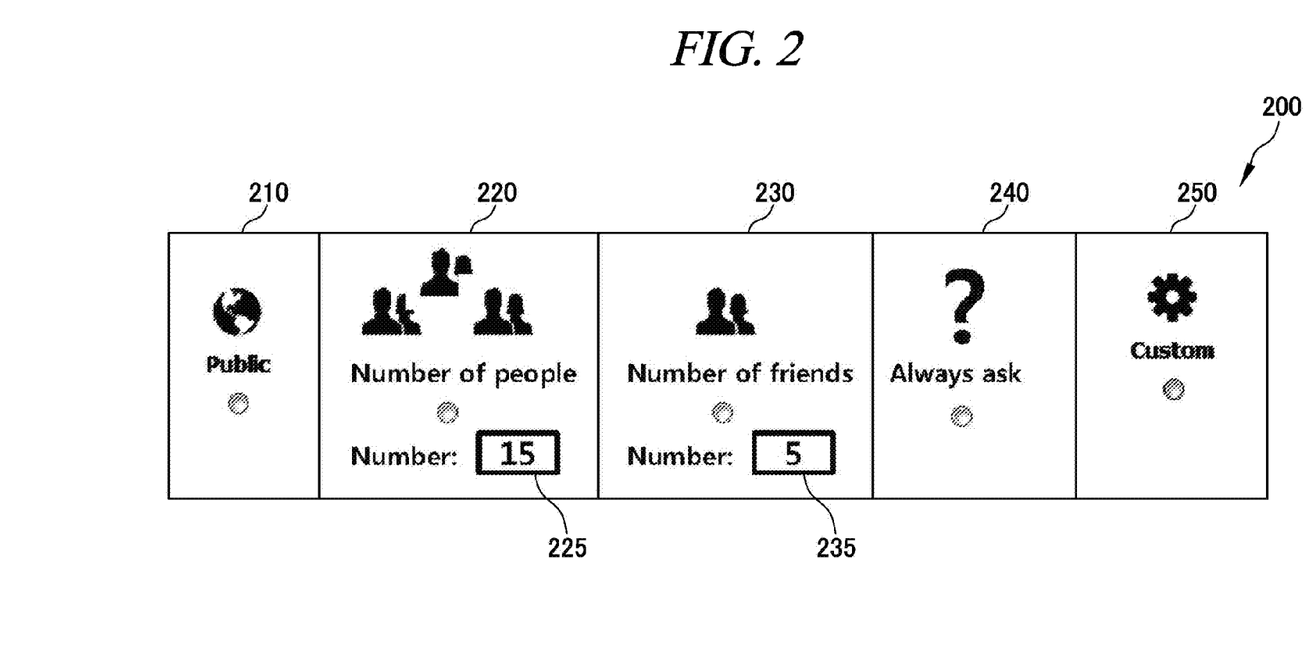
FIG. 2 schematically shows an illustrative example of a condition setting tool, arranged in accordance with at least some embodiments described herein.

FIG. 2 schematically shows an illustrative example of a condition setting tool 200, arranged in accordance with at least some embodiments described herein.

In some embodiments, a server may provide condition setting tool 200 so that the user may specify a default condition to be applied when the user taps or clicks conditional favorability button 130. The user's device may display condition setting tool 200 provided by the server, and the user may interact with the server via condition setting tool 200 displayed on his/her device.

In some embodiments, condition setting tool 200 may include several buttons to be selected by the user, including a "public" button 210, a "number of people" button 220, a "number of friends" button 230, an "always ask" button 240, and a "custom" button 250. By selecting "public" button 210, the user may not use a conditional favorability function for online forum 100. By selecting "number of people" button 220, the user may set the default condition as disclosing his/her response when a threshold number of other users have made a same response, and select the threshold number by entering a desired number in an area 225. By selecting "number of friends" button 230, the user may set the default condition as disclosing his/her response when a threshold number of other users in a predetermined group (e.g., a friends group) have made a same response, and select the threshold number by entering a desired number in an area 235. By selecting "always ask" button 240, the user may not determine the default condition, and may select different conditions for respective cases whenever the user taps or clicks conditional favorability button 130. By selecting "custom" button 250, the user may customize the condition as he/she desires.

Although the above examples with reference to FIGS. 1-2 are described under an assumption that the users' responses with regard to content 110 are a favorability rating for content 110, those skilled in the art will appreciate that the above examples are not limited in terms of types of the users' opinion expression. For example, the users' responses may include an intention of re-posting content 110.

Figure 3:
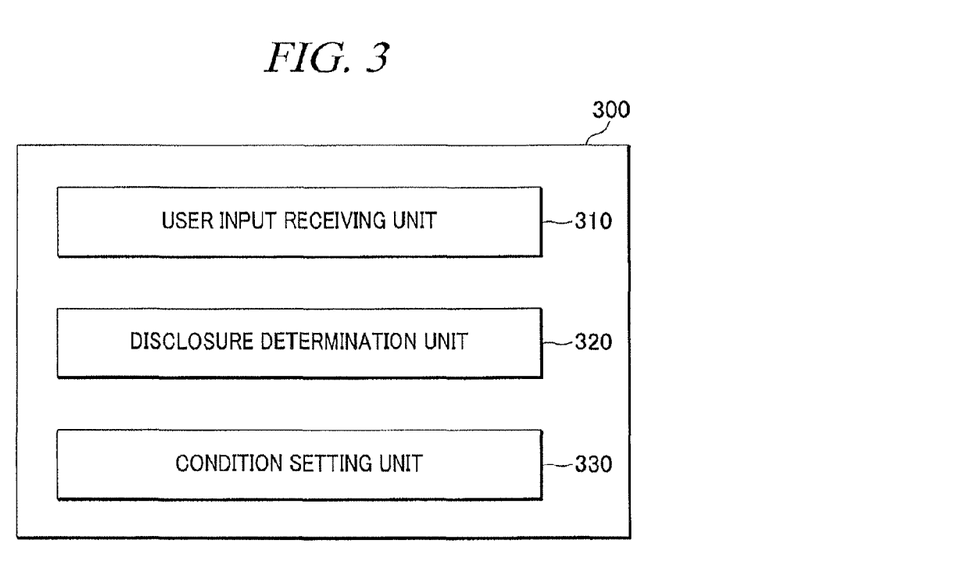
FIG. 3 shows a schematic block diagram illustrating an example architecture of a server, arranged in accordance with at least some embodiments described herein.

FIG. 3 shows a schematic block diagram illustrating an example architecture of a server 300, arranged in accordance with at least some embodiments described herein.

Server 300 may be a server device, a server farm or a server cluster hosting, operating and/or controlling online forum 100. Examples of server 300 may include, but are not limited to, a social networking service (SNS) server.

As depicted in FIG. 3, server 300 may include a user input receiving unit 310, a disclosure determination unit 320 and a condition setting unit 330. Although illustrated as discrete components, various components may be divided into additional components, combined into fewer components, or eliminated while being contemplated within the scope of the disclosed subject matter. It will be understood by those skilled in the art that each function and/or operation of the components may be implemented, individually and/or collectively, by a wide range of hardware, software, firmware, or virtually any combination thereof.

User input receiving unit 310 may be configured to receive from a user an input associated with the user making a response to content 110 posted in online forum 100. By way of example, but not limitation, the user's response may include a favorability rating for content 110. By way of another example, but not limitation, the user's response may include the user's intention of re-posting content 110.

Disclosure determination unit 320 may be configured to determine whether to disclose the user's response to content 110 based at least in part on a threshold condition being satisfied. Disclosure determination unit 320 may determine whether the threshold condition is satisfied with regard to content 110, and disclose the user's response to content 110 when the threshold condition is satisfied.

In some embodiments, when the threshold condition is associated with one or more responses made by other users with regard to content 110, disclosure determination unit 320 may be further configured to disclose the user's response with regard to content 110 when a number of other users who have made a same response as the user with regard to content 110 exceeds a threshold number predetermined by the user. In some other embodiments, when the threshold condition is associated with responses made by other users in a predetermined group with regard to content 110, disclosure determination unit 320 may be further configured to disclose the user's response with regard to content 110 when a number of the other users in the predetermined group who have made a same response as the user exceeds a threshold number predetermined by the user. In yet another embodiment, when the threshold condition is associated with a response made by a specified other user in online forum 100, disclosure determination unit 320 may be further configured to disclose the user's response to content 110 when the response made by the specified other user is the same as the user's response.

Condition setting unit 330 may be configured to set the condition based at least in part on input from the user. In some embodiments, condition setting unit 330 may provide the user with condition setting tool 200 (in FIG. 2), and set the condition based at least in part on the user's interaction with condition setting tool 200.

In some embodiments, condition setting unit 330 may change the condition based at least in part on a property of content 110 posted in online forum 100. By way of example, but not limitation, when content 110 relates to a political issue, condition setting unit 330 may set the condition as disclosing the user's response when a specified other user (e.g., an opinion leader) makes a same response to content 110, while when content 110 relates to a light issue, condition setting unit 330 may set the condition as disclosing the user's response when a predetermined number of other users in a friends group make a same response. In some embodiments, condition setting unit 330 may detect the property of content 110 based at least in part on semantic interpretation of content 110 and/or input from users of online forum 100 (e.g., tagging by the user of online forum 100).

As such, server 300 may introduce into an online social network an offline behavior by which a person only agrees with a concept if enough other people do, or a leader or boss does.

Figure 4:
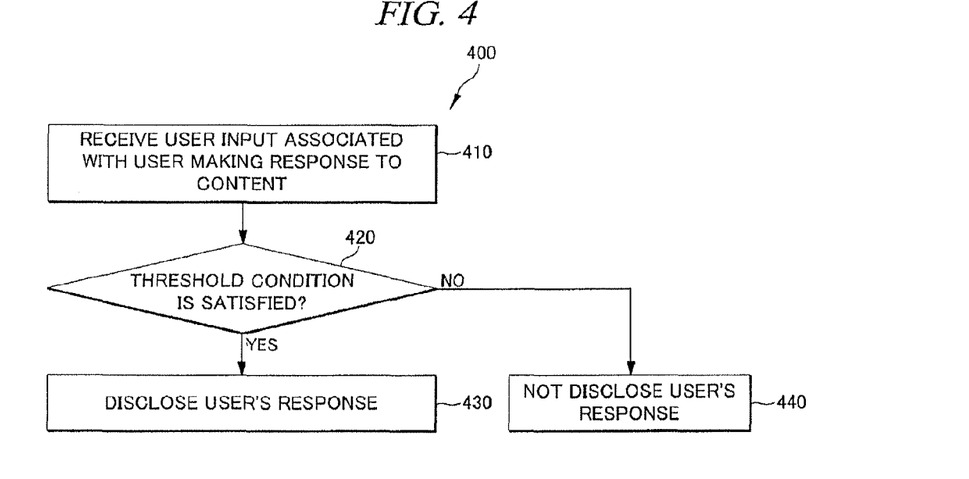
FIG. 4 shows an example flow diagram of a process for disclosing a user's response to a piece of content in an online forum, arranged in accordance with at least some embodiments described herein.

FIG. 4 shows an example flow diagram of a process 400 for disclosing a user's response to a piece of content in an online forum, arranged in accordance with at least some embodiments described herein.

Process 400 may be implemented in a server such as server 300 including user input receiving unit 310, disclosure determination unit 320 and condition setting unit 330, described above. Process 400 may include one or more operations, actions, or functions as illustrated by one or more blocks 410, 420, 430 and/or 440. Although illustrated as discrete blocks, various blocks may be divided into additional blocks, combined into fewer blocks, or eliminated, depending on the desired implementation. Processing may begin at block 410.

At block 410 (Receive User Input Associated with User Making Response to Content), server 300 (e.g., user input receiving unit 310) may receive the user input associated with the user making his/her response to content 110 posted in online forum 100. By way of example, but not limitation, the user's response may include a favorability rating for content 110 and/or the user's intention of re-posting content 110. Processing may continue from block 410 to decision block 420.

At decision block 420 (Threshold Condition Is Satisfied?), server 300 (e.g., disclosure determination unit 320) may determine whether a threshold condition by the user is satisfied for the user's response to be disclosed with regard to content 110. The threshold condition may be associated with one or more responses being made by other users with regard to content 110, one or more responses being made by other users in a predetermined group with regard to content 110, and/or a response being made by a specified other user with regard to content 110. When it is determined that the threshold condition is satisfied, processing may continue from decision block 420 to block decision 430. Otherwise, processing may continue from decision block 420 to block 440.

At block 430 (Disclose User's Response), server 300 may disclose the user's response to content 110.

At block 440 (Not Disclose User's Response), server 300 may not disclose the user's response to content 110. In some embodiments, server 300 may then iterate or repeat decision block 420 when more users further make their responses with regard to content 110.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 5:
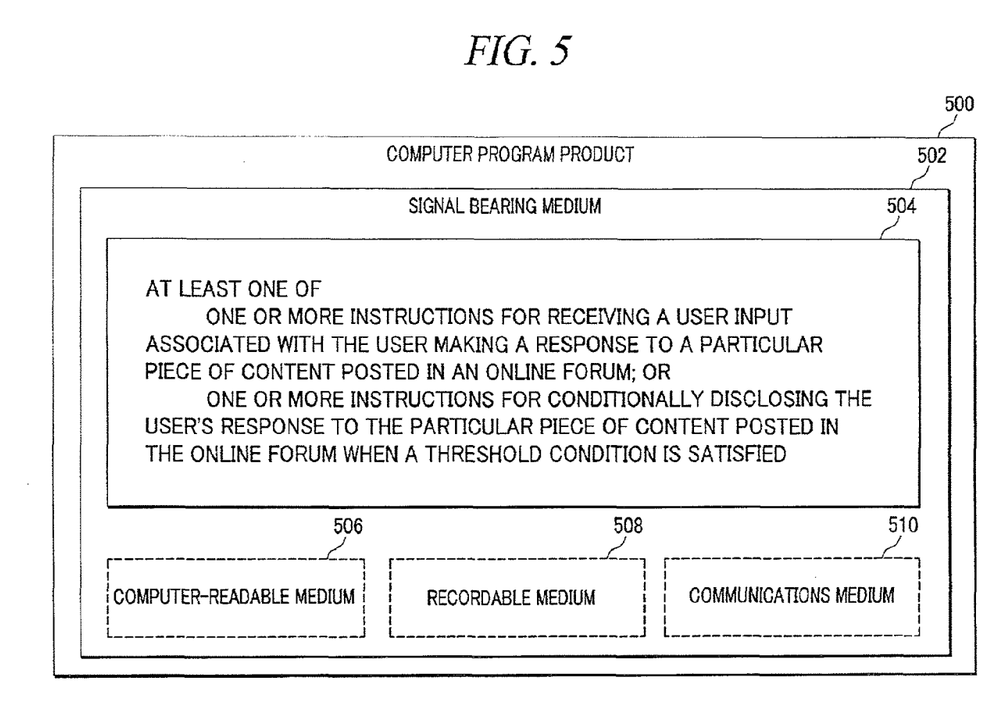
FIG. 5 illustrates an example computer program product that may be utilized to provide a conditional disclosure of a user's response to a piece of content in an online forum, arranged in accordance with at least some embodiments described herein.

FIG. 5 illustrates an example computer program product 500 that may be utilized to provide a conditional disclosure of a user's response to a piece of content in an online forum, arranged in accordance with at least some embodiments described herein.

Program product 500 may include a signal bearing medium 502. Signal bearing medium 502 may include one or more instructions 504 that, when executed by, for example, a processor, may provide the functionality described above with respect to FIGS. 1-4. By way of example, instructions 504 may include: one or more instructions for receiving a user input associated with the user making a response to a particular piece of content posted in an online forum; or one or more instructions for conditionally disclosing the user's response to the particular piece of content posted in the online forum when a threshold condition is satisfied. Thus, for example, referring to FIG. 3, server 300 may undertake one or more of the blocks shown in FIG. 4 in response to instructions 504.

In some implementations, signal bearing medium 502 may encompass a computer-readable medium 506, such as, but not limited to, a hard disk drive, a CD, a DVD, a digital tape, memory, etc. In some implementations, signal bearing medium 502 may encompass a recordable medium 508, such as, but not limited to, memory, read/write (R/W) CDs, R/W DVDs, etc. In some implementations, signal bearing medium 502 may encompass a communications medium 510, such as, but not limited to, a digital and/or an analog communication medium (e.g., a fiber optic cable, a waveguide, a wired communications link, a wireless communication link, etc.). Thus, for example, program product 500 may be conveyed to one or more modules of server 300 by an RF signal bearing medium 502, where the signal bearing medium 502 is conveyed by a wireless communications medium 510 (e.g., a wireless communications medium conforming with the IEEE 802.11 standard).

Figure 6:
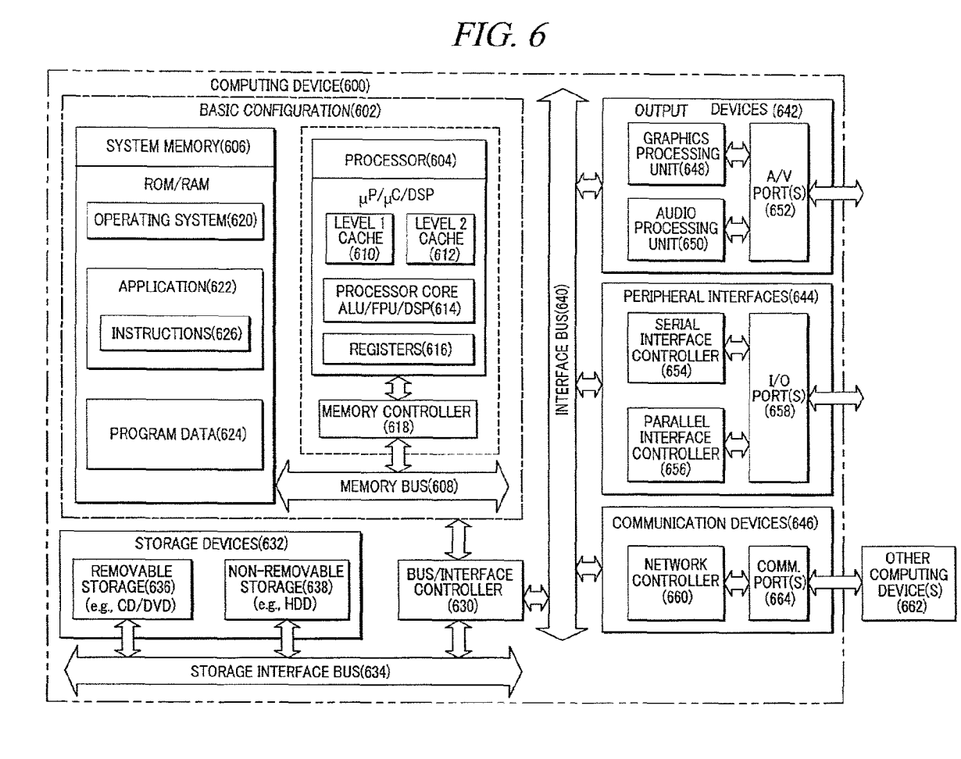
FIG. 6 is a block diagram illustrating an example computing device that may be utilized to provide a conditional disclosure of a user's response to a piece of content in an online forum, arranged in accordance with at least some embodiments described herein.

FIG. 6 is a block diagram illustrating an example computing device 600 that may be utilized to provide a conditional disclosure of a user's response to a piece of content in an online forum, arranged in accordance with at least some embodiments described herein.

In these examples, elements of computing device 600 may be arranged or configured for a server. In a very basic configuration 602, computing device 600 typically includes one or more processors 604 and a system memory 606. A memory bus 608 may be used for communicating between processor 604 and system memory 606.

Depending on the desired configuration, processor 604 may be of any type including but not limited to a microprocessor (µP), a microcontroller (µC), a digital signal processor (DSP), or any combination thereof. Processor 604 may include one or more levels of caching, such as a level one cache 610 and a level two cache 612, a processor core 614, and registers 616. An example processor core 614 may include an arithmetic logic unit (ALU), a floating point unit (FPU), a digital signal processing core (DSP Core), or any combination thereof. An example memory controller 618 may also be used with processor 604, or in some implementations memory controller 618 may be an internal part of processor 604.

Depending on the desired configuration, system memory 606 may be of any type including but not limited to volatile memory (such as RAM), non-volatile memory (such as ROM, flash memory, etc.) or any combination thereof. System memory 606 may include an operating system 620, one or more applications 622, and program data 624. Application 622 may include instructions 626 that may be arranged to perform the functions as described herein including the actions described with respect to the server 300 architecture as shown in FIG. 3 or including the actions described with respect to the flow charts shown in FIG. 4. In some examples, application 622 may be arranged to operate with program data 624 on an operating system 620 such that implementations for instructions for a computing system as described herein.

Computing device 600 may have additional features or functionality, and additional interfaces to facilitate communications between basic configuration 602 and any required devices and interfaces. For example, a bus/interface controller 630 may be used to facilitate communications between basic configuration 602 and one or more data storage devices 632 via a storage interface bus 634. Data storage devices 632 may be removable storage devices 636, non-removable storage devices 638, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 606, removable storage devices 636 and non-removable storage devices 638 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 600. Any such computer storage media may be part of computing device 600.

Computing device 600 may also include an interface bus 640 for facilitating communication from various interface devices (e.g., output devices 642, peripheral interfaces 644, and communication devices 646) to basic configuration 602 via bus/interface controller 630. Example output devices 642 include a graphics processing unit 648 and an audio processing unit 650, which may be configured to communicate to various external devices such as a display or speakers via one or more A/V ports 652. Example peripheral interfaces 644 include a serial interface controller 654 or a parallel interface controller 656, which may be configured to communicate with external devices such as input devices (e.g., keyboard, mouse, pen, voice input device, touch input device, etc.) or other peripheral devices (e.g., printer, scanner, etc.) via one or more I/O ports 658. An example communication device 646 includes a network controller 660, which may be arranged to facilitate communications with one or more other computing devices 662 over a network communication link via one or more communication ports 664.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RE), microwave, infrared (IR) and other wireless media. The term computer readable media as used herein may include both storage media and communication media.

Computing device 600 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 600 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method performed by one or more computer servers that include a processor configured to execute computer-executable instructions stored in a non-transitory computer-readable storage medium to cause the one or more computer servers to perform the method, the method comprising:
    detecting, by the one or more computer servers, a first user input from a first user, wherein the first user input is associated with a user response from the first user to a particular piece of content posted in an online forum by a second user, and wherein the particular piece of content is displayed on a device associated with the first user;
    detecting, by the one or more computer servers, a second user input from the first user, wherein the second user input is associated with an interaction of the first user with a condition setting tool that is executed by the one or more computer servers and that is displayed on the device associated with the first user, wherein the condition setting tool includes at least a conditional favorability function, and wherein the conditional favorability function includes a plurality of selectable conditions associated with a disclosure of the user response from the first user, in the online forum, to the particular piece of content;
    setting, by the condition setting tool, a selected condition of the plurality of selectable conditions, based on the second user input, wherein the selected condition is set for the disclosure of the user response from the first user, in the online forum, to the particular piece of content; and
    disclosing, by the one or more computer servers, the user response to the particular piece of content posted in the online forum after the selected condition is met, else preventing the disclosure of the user response in the online forum while the selected condition is unmet, such that the one or more computer servers provide a conditional disclosure capability in which the disclosure of the user response or the prevention of the disclosure thereof is made controllable through the condition setting tool and by the selected condition set by the condition setting tool.

2. The method of claim 1, wherein the user response includes an expression of favorability to the particular piece of content posted in the online forum, a re-posting of the particular piece of content posted in the online forum, or a favorability rating given to the particular piece of content posted in the online forum.

3. The method of claim 1, wherein the selected condition is associated with one or more responses to the particular piece of content posted in the online forum made by other users in a group or by a specified other user.

4. The method of claim 1, wherein the selected condition is associated with a minimum number of other users who have made a same response to the particular piece of content posted in the online forum.

5. The method of claim 1, wherein the setting includes specifying a default condition.

6. The method of claim 1, wherein the setting includes enabling the first user to set the selected condition after the first user input is received.

7. The method of claim 1, wherein the setting includes setting the selected condition after a favorability button in the online forum or a comment button in the online forum is tapped or clicked.

8. The method of claim 1, wherein the online forum includes a social networking site.

9. The method of claim 1, further comprising disclosing, by the one or more computer servers, a user identity after the selected condition is met.

10. The method of claim 1, wherein the selected condition includes a property of the particular piece of content.

11. A computer server that includes a processor configured to execute computer-executable instructions stored in a non-transitory computer-readable storage medium, the computer server comprising:
    a user input receiver unit configured to:
        receive a first user input from a user device associated with a first user, wherein the first user input is from the first user and is associated with a user response from the first user to a particular piece of content posted in an online forum by a second user, and wherein the particular piece of content is displayed on the user device; and
        receive a second user input from the user device;
    a condition setting tool that includes at least a conditional favorability function, wherein the conditional favorability function includes a plurality of selectable conditions associated with a disclosure of the user response from the first user, in the online forum, to the particular piece of content, and wherein the condition setting tool is configured to:
        set a selected condition, of the plurality of selectable conditions, based on the second user input, wherein the selected condition is set for the disclosure of the user response from the first user, in the online forum, to the particular piece of content, and wherein the second user input is associated with an interaction of the first user with the condition setting tool; and
    a disclosure determination unit configured to disclose the user response from the first user to the particular piece of content posted in the online forum, after the selected condition is met.

12. The computer server of claim 11, wherein the computer server includes a social networking service (SNS) server, and wherein the online forum is associated with the SNS server.

13. The computer server of claim 11, wherein the selected condition includes a minimum number of other users who have submitted a same response to the particular piece of content posted in the online forum.

14. The computer server of claim 11, wherein the disclosure determination unit is further configured to disclose a user identity after the selected condition is met.

15. The computer server of claim 11, wherein the condition setting tool includes one or more buttons, and wherein each button corresponds to a respective selectable condition.

16. A system, comprising:

a user device; and one or more computer servers that are communicatively coupled to the user device and that include a processor configured to execute computer-executable instructions stored in a non-transitory computer-readable storage medium, wherein the one or more computer servers are configured to:

receive a first user input from a first user that uses the user device, wherein the first user input is received from the user device and is associated with a user response from the first user to a particular piece of content posted in an online forum by a second user, and wherein the particular piece of content is displayed on the user device;

receive a second user input from the user device, wherein the second user input is associated with an interaction of the first user with a condition setting tool that is executed by the one or more computer servers and that is displayed on the user device, wherein the condition setting tool includes at least a conditional favorability function, and wherein the conditional favorability function includes a plurality of selectable conditions associated with a disclosure of the user response from the first user, in the online forum, to the particular piece of content;

set a selected condition of the plurality of selectable conditions, by use of the condition setting tool and based on the second user input;

detect a property of the particular piece of content based at least, in part, on semantic interpretation of the particular piece of content or input from users of the online forum;

modify the selected condition based on the detected property of the particular piece of content; and     disclose the user response to the particular piece of content posted in the online forum after the modified condition is met, wherein the user device is configured to:

transmit the first user input to the one or more computer servers; and     transmit the second user input to the one or more computer servers.

17. The system of claim 16, wherein the user response includes an expression of favorability to the particular piece of content posted in the online forum or a re-posting of the particular piece of content posted in the online forum.

18. The system of claim 16, wherein the selected condition is associated with one or more responses to the particular piece of content posted in the online forum made by other users in a group or by a specified other user.

19. The system of claim 16, wherein the selected condition includes a minimum number of other users who have expressed their favorability to the particular piece of content posted in the online forum.

20. The system of claim 16, wherein the one or more computer servers are further configured to count users who have submitted a same response to the particular piece of content posted in the online forum but have concealed their identity until the selected condition is met.

* * * * *

UNITED STATES PATENT AND TRADEMARK OFFICE
CERTIFICATE OF CORRECTION

PATENT NO.         : 9,930,001 B2
APPLICATION NO.    : 14/926417
DATED              : March 27, 2018
INVENTOR(S)        : Jung It is certified that error appears in the above-identified patent and that said Letters Patent is hereby corrected as shown below:

In the Specification

Column 9, Line 29, delete "radio frequency (RE)," and insert -- radio frequency (RF), --, therefor.

In the Claims

Column 12, Line 51, Claim 11, delete "response from" and insert -- response, from --, therefor.

Signed and Sealed this
Fifth Day of June, 2018

Andrei Iancu
*Director of the United States Patent and Trademark Office*